United States Patent
Ni

(10) Patent No.: US 9,915,744 B2
(45) Date of Patent: Mar. 13, 2018

(54) METHOD AND GHOST ATTENUATOR FOR MITIGATING GHOST EFFECT

(71) Applicant: CGG SERVICES SA, Massy (FR)

(72) Inventor: Yuan Ni, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/123,851

(22) PCT Filed: Mar. 12, 2015

(86) PCT No.: PCT/IB2015/000512
§ 371 (c)(1),
(2) Date: Sep. 6, 2016

(87) PCT Pub. No.: WO2015/136364
PCT Pub. Date: Sep. 17, 2015

(65) Prior Publication Data
US 2017/0031043 A1   Feb. 2, 2017

Related U.S. Application Data

(60) Provisional application No. 61/952,910, filed on Mar. 14, 2014.

(51) Int. Cl.
*G01V 1/38* (2006.01)
*G01V 1/36* (2006.01)
(52) U.S. Cl.
CPC .............. *G01V 1/36* (2013.01); *G01V 1/3808* (2013.01); *G01V 1/3861* (2013.01); *G01V 2210/1293* (2013.01); *G01V 2210/56* (2013.01)
(58) Field of Classification Search
CPC ...... G01V 1/3861; G01V 1/36; G01V 1/3808; G01V 2210/1293; G01V 2210/56

USPC .......................................................... 367/24
See application file for complete search history.

(56) References Cited

U.S. PATENT DOCUMENTS

| | | | |
|---|---|---|---|
| 4,632,213 A | 12/1986 | Domenico |
| 4,648,479 A | 3/1987 | Dolengowski |
| 8,014,228 B2 | 9/2011 | Schreurs et al. |
| 8,085,617 B2 | 12/2011 | Lansley et al. |
| 8,561,754 B2 | 10/2013 | Ni |
| 2006/0176774 A1 | 8/2006 | Toennessen |
| 2012/0287752 A1 | 11/2012 | Payen et al. |

(Continued)

FOREIGN PATENT DOCUMENTS

| | | |
|---|---|---|
| GB | 826932 | 1/1960 |
| GB | 1161525 | 8/1969 |
| GB | 1376513 | 12/1974 |

(Continued)

OTHER PUBLICATIONS

International Search Report in related International Application No. PCT/IB2015/000512, dated Jan. 12, 2015.

(Continued)

*Primary Examiner* — Daniel L Murphy
(74) *Attorney, Agent, or Firm* — Patent Portfolio Builders PLLC

(57) ABSTRACT

Marine seismic sources for exploring formations under the seafloor using reflection seismology include ghost attenuators for reducing or eliminating ghost signals. Such a ghost attenuator is located in the water above an individual source element and 5 water surface and is configured to dissipate energy of up-going signals and/or to redirect the up-going signals.

20 Claims, 6 Drawing Sheets

(56) References Cited

U.S. PATENT DOCUMENTS

2013/0098704 A1    4/2013  Ni

FOREIGN PATENT DOCUMENTS

| GB | 2481840 A | 1/2012 |
|---|---|---|
| GB | 2490787 A | 11/2012 |
| GB | 2495601 A | 4/2013 |
| WO | 2012/004587 A2 | 1/2012 |

OTHER PUBLICATIONS

Written Opinion of the International Searching Authority in related International Application No. PCT/IB2015/000512, dated Jan. 12, 2015.

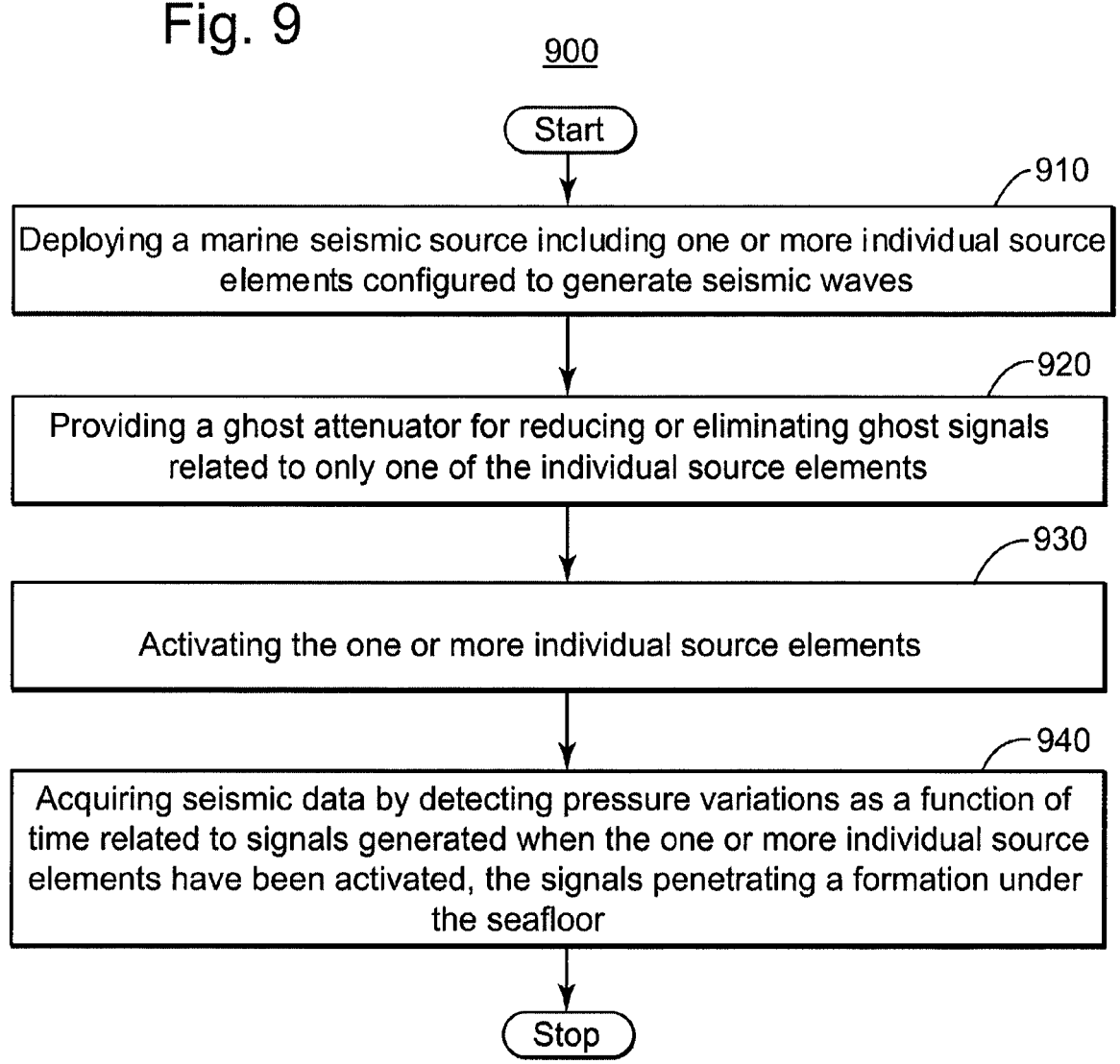

METHOD AND GHOST ATTENUATOR FOR MITIGATING GHOST EFFECT

CROSS REFERENCE TO RELATED APPLICATIONS

This application is a National Stage of International Application No. PCT/IB2015/000512 filed Mar. 12, 2015, which claims priority and benefit from U.S. Provisional Patent Application 61/952,910 filed Mar. 14, 2014, for "Ghost eliminator for air-gun source,"the content of which is incorporated in its entirety herein by reference.

BACKGROUND

Technical Field

Embodiments of the subject matter disclosed herein generally relate to marine seismic sources able to mitigate ghost effect, more specifically, to devices reducing up-going signals that would otherwise cause ghost signals, which interfere with down-going primary signals.

Discussion of the Background

Exploring sedimentary rock formations under the seafloor of the world's oceans and other water bodies is an ongoing process driven by (yet not limited to) seeking gas and oil reservoirs. Variations of seismic signals' propagation velocity from one formation layer to another cause the signals to be reflected, refracted and/or transmitted. Seismic receivers detect time-dependent pressure variations related to the signals traveling through the explored formations. Seismic data (i.e., detected time-dependent pressure variations) provides information about the structure of the explored formation.

Schematically, a marine seismic data acquisition system includes at least one source and one or more receivers. In the marine environment, a source may include plural individual source elements, such as air-guns or vibrators. The source is activated to generate seismic signals (i.e., time-varying pressure propagating in all directions). The receivers may be housed by streamers towed or placed on the seafloor. The sources and/or the receivers are operated to probe formations under the seafloor in a surveyed area.

The seismic signals propagating downward from the source toward the seafloor are known as primary signals. Some of the seismic signals propagating upward from the source to the water surface are reflected at the water-air interface. These reflected signals, known as ghost signals, are phase-shifted about 180°. As is well known, any signal can be expressed as a sum of waves of different frequencies. Having the same source, the ghost and primary signals have similar frequency spectra. The ghost signals are delayed in time (due to the additional path traveled to and from the water surface) and interfere with the primary signals. The resulting interference signals penetrate the seafloor. Some of the waves of the primary and of the ghost signals interfere constructively, but other waves interfere destructively, yielding so-called notches in the spectra of the interference signals. These notches cause loss of information about the explored formation.

Various data acquisition and processing methods try to mitigate the above-described ghosting phenomenon. The methods may require using additional streamers, firing the individual sources following a certain sequence, having individual sources placed at different depths in the water, and/or using time-consuming mathematical algorithms to take into consideration the ghost effect during data processing. However, all these methods result in an undesirable cost increase.

U.S. Pat. No. 8,561,754 (the content of which is incorporated in its entirety herein by reference) describes a source including a coverage (reflection) plate located between individual source elements of a source sub-array and the water surface. The coverage plate reflects less energy than the water-air surface, thus boosting the energy in the low-frequency band of interest. This solution presents the challenge that such a plate made of cement or steel is heavy (e.g., 500-1,000 kg), requiring additional towing energy.

Accordingly, it would be desirable to develop other devices and methods able to mitigate the ghost effect on the signal penetrating the seafloor into the explored formation.

SUMMARY

According to some embodiments, seismic sources include ghost attenuators configured to absorb or redirect up-going signals.

According to an embodiment, there is a marine seismic source including individual source elements configured to generate seismic waves, and a ghost attenuator for reducing or eliminating ghost signals related to only one individual source. The ghost attenuator is located between the one of the individual source elements and the water surface. The ghost attenuator is configured to dissipate energy of up-going signals and/or to redirect the up-going signals from the one of the individual source elements.

According to another embodiment, there is a ghost attenuator for reducing or eliminating ghost signals related to an individual source element of a marine seismic source. The ghost attenuator has an outer shell made of plastic and filled with a substance having a positive buoyancy. A signal propagation velocity in the substance is smaller than a signal propagation velocity in water. The outer shell has a triangular cross-section in a vertical plane, the triangular cross-section having substantially horizontal upper side and an attack angle opposite to the upper side that is adjustable.

According to yet another embodiment, there is a method for seismic data acquisition. The method includes deploying a marine seismic source including one or more individual source elements configured to generate seismic waves. The method further includes providing a ghost attenuator for reducing or eliminating ghost signals related to one of the individual source elements only. The ghost attenuator is configured to dissipate energy of up-going signals and/or to redirect the up-going signals from the one of the individual source elements. The method then includes activating the one or more individual source elements, and acquiring seismic data by detecting pressure variations as a function of time related to signals generated when the one or more individual source elements have been activated, the signal penetrating a formation under the seafloor.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 9 is a flowchart of a method for dissipating and/or redirecting up-going signals' energy according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic source. However, similar embodiments and methods may be used for a land data (buried source) and for surveys using electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following methods and devices (called "ghost attenuators") reduce or eliminate ghost signals occurring due to the negative reflection of seismic signal energy on the water-air interface. This reduction or elimination can be full-band or only effective for a certain frequency band. Ghost attenuators placed above source elements are configured to dissipate energy of the up-going signals and/or to redirect the up-going signals.

Figure 1:
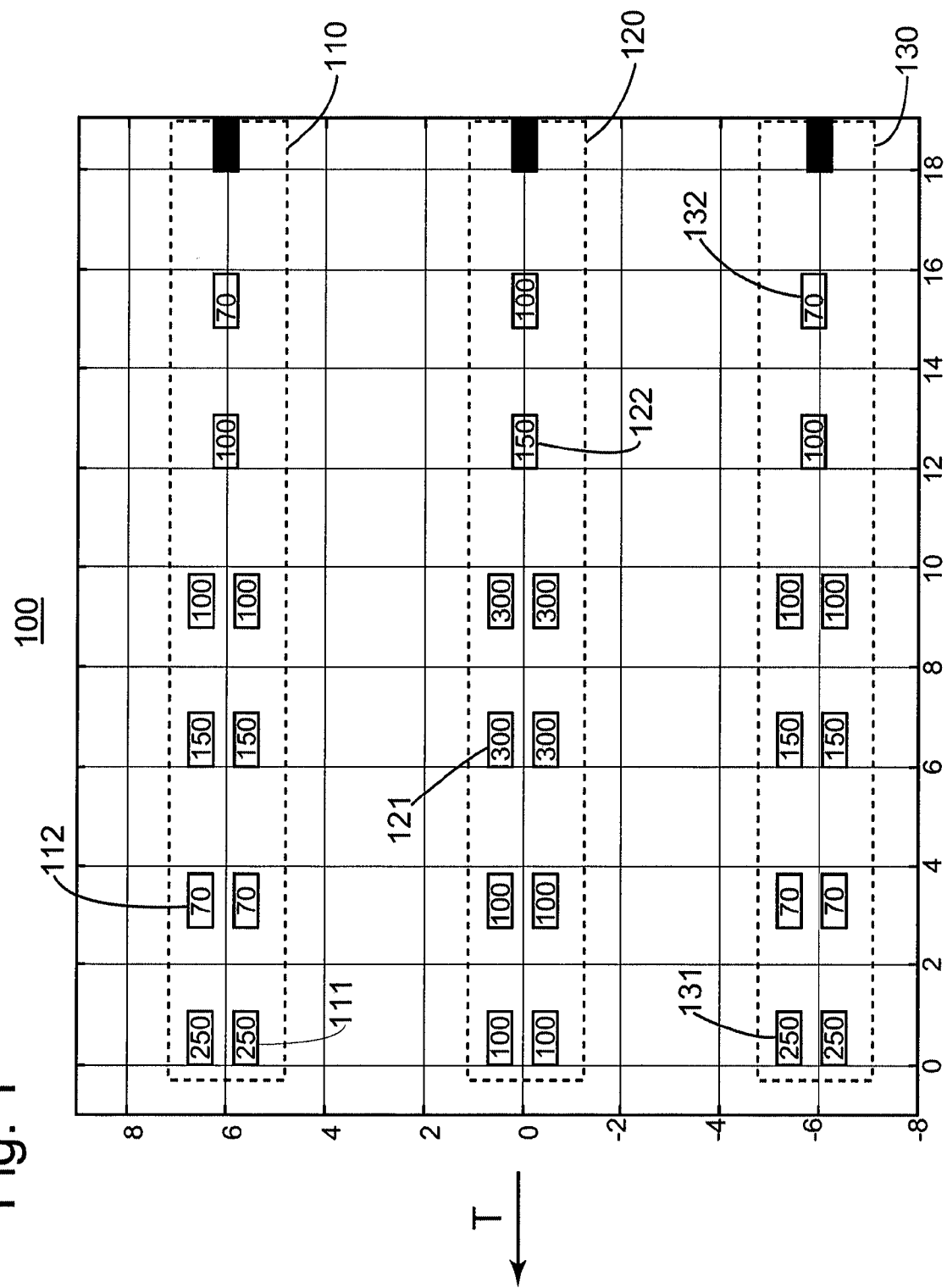
FIG. 1 is a schematic representation of a marine source according to an embodiment.

As illustrated in FIG. 1, a marine seismic source 100 towed in direction T may include several sub-arrays such as 110, 120 and 130. Each sub-array includes individual source elements such as 111, 112, 121, 122, 131 and 132 (not all individual source elements are labeled in FIG. 1). The individual source elements of a sub-array may be linked to one another and may have a common support and towing structure. The number of sub-arrays and individual source elements in FIG. 1 are merely exemplary and not intended to be limiting. The individual source elements may be air-guns. Each individual source element of a sub-array may have distinct characteristics (e.g., volume of an air-gun) and may be placed at its individual depth or inline position. At least one ghost attenuator configured to reduce or eliminate ghosts is associated with a source element of source 100.

Figure 2:
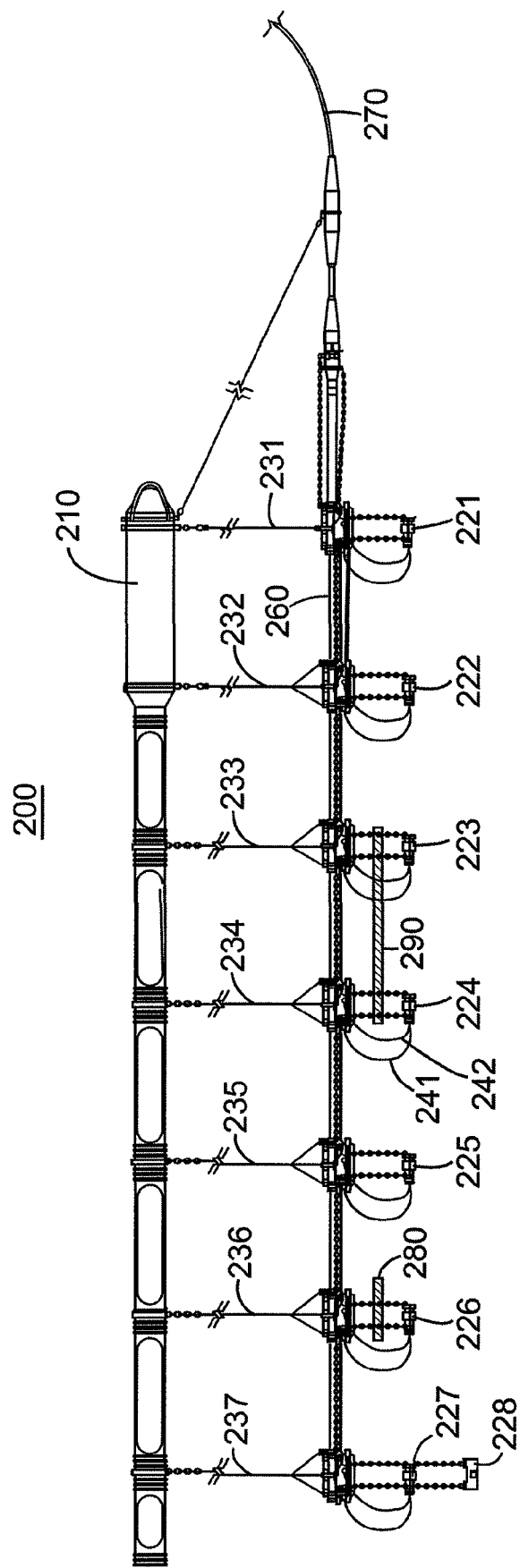
FIG. 2 is a schematic representation of a sub-array according to an embodiment.

FIG. 2 illustrates a single sub-array 200 (e.g., 110-130 in FIG. 1) that includes one or more floats 210 from which the individual source elements 221-228 are suspended with cables or ropes 231-237 (which may have, in one embodiment, a length of around 5 m). Individual source elements may be provided at the same in-line location, such as 227 and 228, which have different depths. Various cables connect the individual source elements to the vessel to provide electric power, compressed air, data transmission, etc. For example, a cable 241 provides compressed air, and a cable 242 provides electric power and/or data transmission to source element 224. The individual source elements may be attached to source bases such as 250, which are connected to each other via links 260 (only one labeled). Source 200 is connected to a towing vessel (not shown) via an umbilical 270.

Above each one or more of the individual sources may be attached a ghost attenuator for reducing or eliminating ghost signals such as the ones described hereinafter. Thus, ghost attenuator 280 reduces or eliminates ghosts for source element 226, while ghost attenuator 290 reduces or eliminates ghosts for source elements 223 and 224. It should be understood that these illustrations are merely exemplary and not intended to be limiting. For example, in one embodiment, each source element may be associated with a ghost attenuator configured to reduce or eliminate ghosts. In another embodiment, a ghost attenuator is configured to reduce or eliminate ghosts for all the source elements of a sub-array. In order to reduce or eliminate ghosts for a source element, the ghost attenuator (or a portion thereof in case the ghost attenuator serves more than one source element) is placed between the source element and the water surface. The ghost attenuator is located closer to the source element than to the water surface. The closer the ghost attenuator is to the source element, the smaller its dimensions. Therefore, the ghost attenuator is preferably placed as close as achievable (i.e., without disrupting the source element's operation) to the source element. For example, if the source element is towed at a depth between 6-15 m, the ghost attenuator is placed 1-2 m above the source element.

Ghost attenuators 280 and 290 may be attached to float 210 via rigid or soft (bendable) ties. However, the ghost attenuator may also be attached to the base plates. If the ghost attenuator is lighter than water, it may be attached only to the source element.

In FIGS. 3-8, ghost attenuators configured to reduce or eliminate ghost signals are described relative to a single individual source, but it should be understood that they may be configured to extend over plural individual sources. FIGS. 3-8 are vertical (i.e., including gravity direction g) cross-sections perpendicular to the towing direction.

Figure 3:
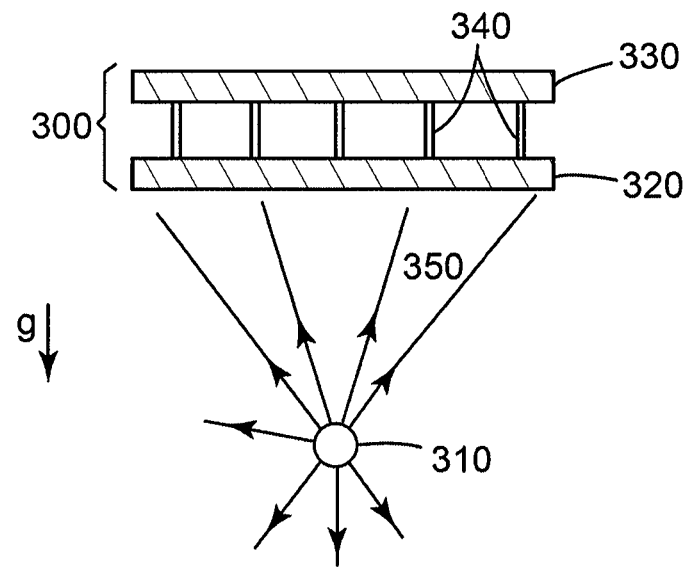
FIG. 3 illustrates a ghost attenuator for dissipating energy of up-going signals generated by an individual source according to an embodiment.

FIG. 3 illustrates a ghost attenuator 300 for dissipating energy of up-going signals generated by individual source 310 according to an embodiment. Ghost attenuator 300 includes two plates 320 and 330 substantially parallel with one another and the water surface. The plates are attached via elastic or rigid links 340 there-between. Equilibrium vertical distance between the plates may be 30-50 cm, and the thickness of the plates may vary from 0.5 cm to 50 cm, depending on the material and different potential interior structure. Plates 320 and 330 may be made of metal (e.g., steel), plastic and/or foam, or may be a multilayer composite of these materials.

Up-going seismic signals 350 impinging on plate 320 (which is closer to source 310) push plate 320 up (i.e., the signals' energy is converted into motion energy). Part of the energy is then dissipated due to the friction of (now up-going) plate 320 with water. If links 340 are rigid, then plate 330 is also pushed up, dissipating the energy due to its friction with water. If links 340 are elastic, part of the energy is stored by the links. However, buoyancy of ghost attenuator 300 is changed due to plate 320's motion, and, therefore, plate 330 also moves up (energy again dissipating due to plate 330's friction with water). Thus, on one hand the up-going signals no longer travel to the water surface, and, on the other hand their energy is dissipated. The signal components whose frequencies are close to the duo-plate system's intrinsic oscillation frequency are more efficiently absorbed and thus dissipated, the ghost attenuator thus operating as a frequency selector. Even if eventually ghost attenuator 300 returns to its equilibrium position and therefore generates down-traveling energy (signals), these signals occur significantly later after the primary signals than the ghost signals. This additional delay and the source's motion in the tow direction spatially separate these signals from the primary signals, so the undesirable interference no longer occurs.

If ghost attenuator 300 is configured for a single source, its horizontal cross-sections through plates 320 or 330 are circular. For example, for a distance from the lower plate to the source of about 2 m, the circular cross-sections may have diameters of 4-5 m.

Figure 4:
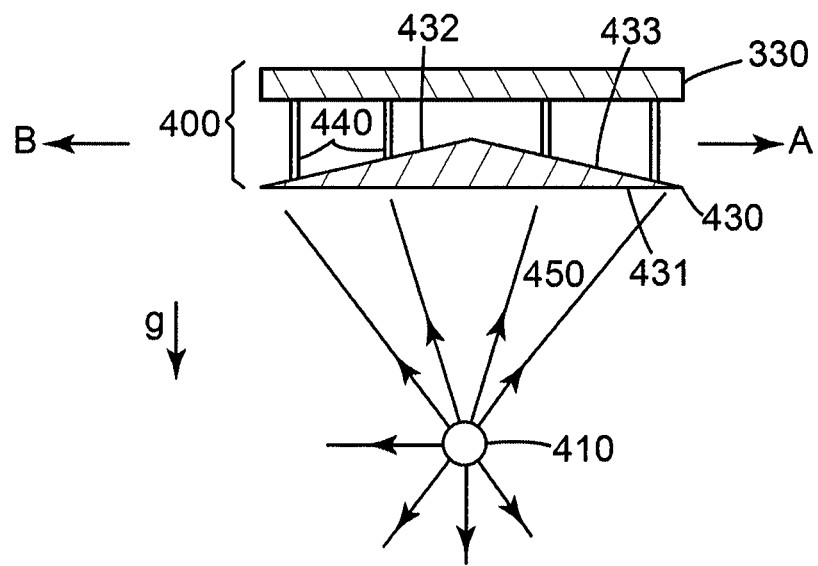
FIG. 4 illustrates a ghost attenuator for dissipating and redirecting energy of up-going signals generated by an individual source according to another embodiment.

FIG. 4 illustrates a ghost attenuator 400 for redirecting and dissipating energy of up-going signals generated by an individual source 410. Ghost attenuator 400 includes a substantially horizontal plate 420 and another element 430 located between plate 420 and source 410. Element 430 has a triangular profile, with its lower side 431 substantially parallel to the water surface. The other sides of element 430 (432 and 433) are attached to plate 420 via elastic or rigid links 440. Up-going seismic signals 450 impinging on element 430 push it up (i.e., the signals' energy is converted into motion energy). Part of the energy is dissipated due to the friction of (now up-going) element 430 with water, and part of the energy is redirected laterally left and right as suggested by arrows A and B. Symmetry relative to the vertical line passing through source 410 is preferred (to avoid actual horizontal displacement of 400), but optional. If links 440 are rigid, then plate 420 is also pushed up, dissipating the energy due to its friction with water. If links 440 are elastic, part of the energy is stored by the links. However, buoyancy of ghost attenuator 400 is changed due to element 430's motion, and, therefore, plate 420 also moves up (energy again dissipating due to plate 420's friction with water). Thus, when ghost attenuator 400 is present, the up-going signals no longer travel to the water surface, and their energy is partially dissipated via friction and partially redirected laterally. Element 430 and plate 420 may be made of steel, plastic and/or foam, or may be a multilayer composite of these materials.

Similar to ghost attenuator 300, ghost attenuator 400 eventually returns to its equilibrium (initial) position and, therefore, may then generate down-traveling energy (signals). These signals occur significantly later after the primary signals than the ghost signals. The additional delay and the source's motion in the tow direction spatially separate these signals from the primary signals, so that the undesirable interference no longer occurs.

If ghost attenuator 400 is configured for a single source, its horizontal cross-section through plate 420 is circular, and element 430 has a conic shape.

Figure 5:
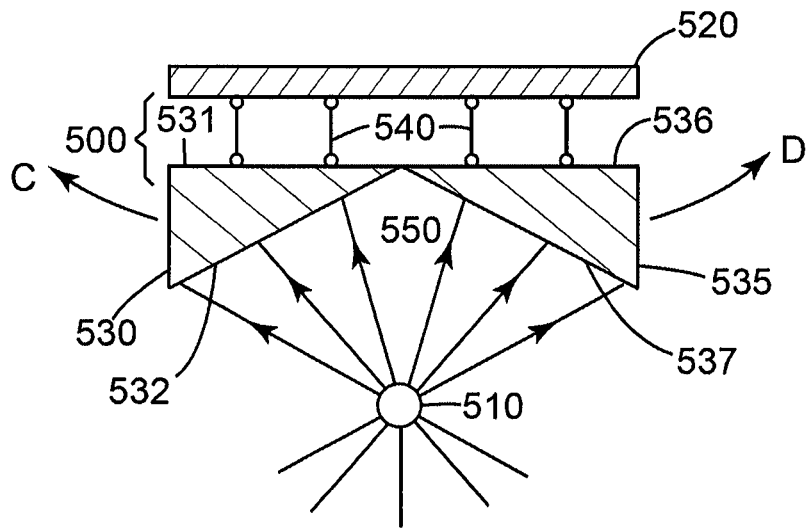
FIG. 5 illustrates a ghost attenuator for dissipating and redirecting energy of up-going signals generated by an individual source according to yet another embodiment.

FIG. 5 is a ghost attenuator 500 for dissipating and redirecting energy of up-going signals generated by an individual source 510 according to yet another embodiment. Ghost attenuator 500 includes a substantially horizontal flat plate 520 and one or more other elements such as 530 and 535 located between plate 520 and source 510. Elements 530 and 535 have triangular profiles with upper sides (531 and 536, respectively) substantially parallel to plate 520 and the water surface. These upper sides are attached to plate 520 via rigid links 540 that are able to rotate about their attachment points. Up-going seismic signals 550 impinging on elements 530 and 535 push them up (i.e., the signals' energy is converted into motion energy). Due to the rigid links, elements 530 and 535 are unable to move straight up, and due to slanted sides 532 and 537, elements 530 and 535 are also pushed laterally as suggested by arrows C and D. Part of the up-going signals' energy is dissipated due to the friction of elements 530 and 535 with water, and part of the energy is redirected, pushing the water laterally. Buoyancy of ghost attenuator 500 is changed due to elements 530 and 535's motion, and, therefore, plate 520 also moves up (energy again dissipating due to plate 520's friction with water). Thus, when ghost attenuator 500 is present, the up-going signals no longer travel to the water surface, and their energy is dissipated via friction or redirected laterally. Elements 530 and 535 as well as plate 520 may be made of metal (steel), plastic and/or foam, or may be a multilayer composite of these materials.

As elements 530, 535 and 520 eventually return to their equilibrium (initial) positions, down-traveling energy (signals) may occur. These signals are significantly delayed and have less energy than the ghost signals would have had. Due to the source's motion in the tow direction, these delayed signals are spatially separated from the primary signals, so that the undesirable interference no longer occurs.

If ghost attenuator 500 is configured for a single source, its horizontal cross-section through plate 520 is circular, and elements 530 and 535 at equilibrium form a cylinder with a conic shape missing in the middle. Alternatively, elements 530 and 535 may be wedge plates.

Figure 6:
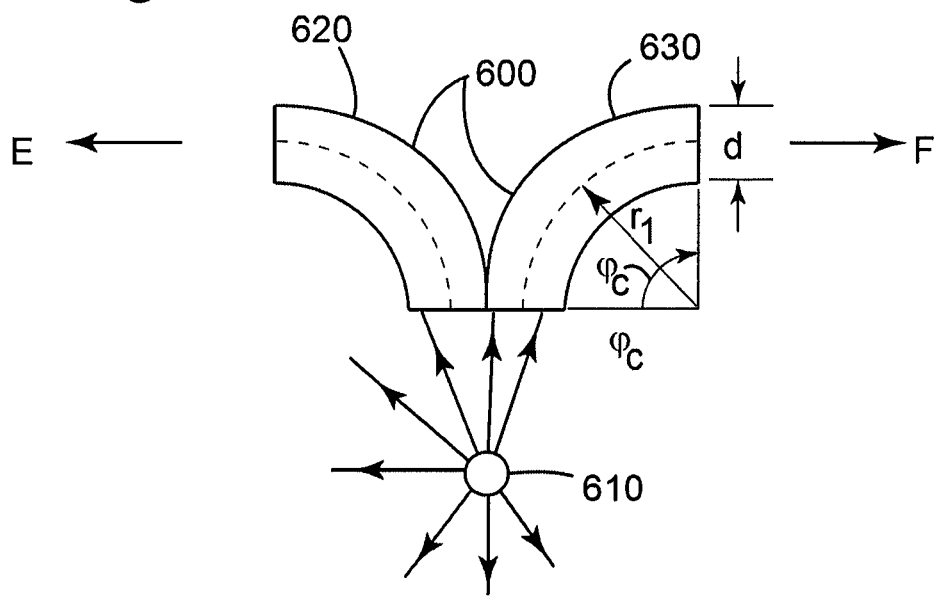
FIG. 6 illustrates a ghost attenuator for dissipating and redirecting energy of up-going signals generated by an individual source according to another embodiment.

FIG. 6 is a ghost attenuator 600 for redirecting energy of up-going signals generated by an individual source 610 according to another embodiment. Ghost attenuator 600 includes two tubes 620 and 630 configured to redirect the up-going signals laterally to directions E and F, respectively. In other embodiments, the ghost attenuator may include a single tube or four tubes. The single tube embodiment has the disadvantage of being pushed by forces opposite to the direction of the water flow passing through the tube. If the ghost attenuator has two (as illustrated) or four tubes, then equal and opposite forces for the back-to-back tubes cancel. Each tube is characterized by a bending radius $r_1$, a bending angle $\phi_c$ and a tube diameter d. In one embodiment, tubes with $r_1=1$ m, d=1 m and $\phi_c=90°$ divert low frequency (<10 Hz) waves. In one embodiment, the bending angle $\phi_c=180°$, essentially redirecting the up-going signals down to constructively interfere with the primary signals.

Figure 7:
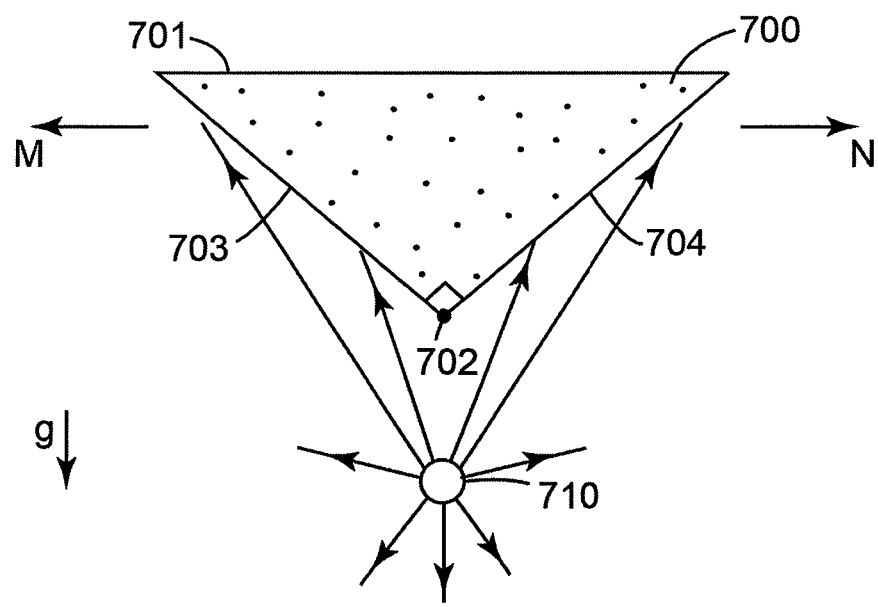
FIG. 7 illustrates a ghost attenuator for dissipating and redirecting energy of up-going signals generated by an individual source according to another embodiment.

FIG. 7 is a ghost attenuator 700 for redirecting laterally the energy of up-going signals generated by an individual source 710 according to another embodiment. Ghost attenuator 700 is a wedge plate with a triangular cross-section having its upper side 701 substantially horizontal. Vertex 702 opposite to side 701 is substantially vertically above source 710. Sides 703 and 704 (which meet at vertex 702) are preferably symmetric relative to a vertical line passing through source 710 and vertex 702, to avoid a lateral net force action on ghost attenuator 700. However, in other embodiments the ghost attenuator may be shaped to favor or exclusively direct signals to one side. When up-going signals 730 impinge on sides 703 and 704, ghost attenuator 700 is pushed up, and at the same time the signals are redirected laterally as suggested by arrows M and N. Thus, part of the up-going signals' energy is dissipated due to friction between ghost attenuator 700 and water, and another part of the energy is redirected laterally because a signal propagation velocity inside the float is smaller than a signal propagation velocity in water.

Ghost attenuator 700 may have outer surfaces made of rigid or soft plastic, and may be filled with air or light foam. Thus, ghost attenuator 700 may be a float having positive buoyancy. In FIG. 7, the attack angle between sides 703 and 704 is 90°. However, this attack angle may be adjustable to optimize a source's operation according to the local conditions (currents, depth of the source, distance to another source, etc.). This angle may be adjusted during a survey.

Figure 8:
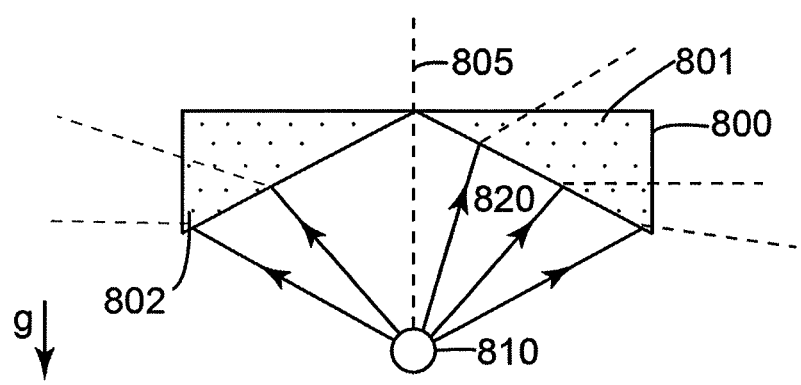
FIG. 8 illustrates a ghost attenuator for dissipating and redirecting energy of up-going signals generated by an individual source according to another embodiment.

FIG. 8 illustrates a ghost attenuator 800 for redirecting energy of up-going signals generated by an individual source 810 according to another embodiment. Ghost attenuator 800 has a negative lens shape, with a substantially horizontal side 801. The lower surface having profile 802 is shaped so that device 800 is thin vertically above source 810, and its thickness increases with distance from a vertical line 805 passing through source 810 (as suggested by the dashed lines). Ghost attenuator 800 disperses up-going signals 820 away from the vertical line. Similar to ghost attenuator 700, ghost attenuator 800 may have an outer shell made of rigid or soft plastic filled with air or foam. Preferably, ghost attenuator 800 is symmetric relative to the vertical line 805.

A method for seismic data acquisition may thus involve using any of the ghost attenuators disclosed in this section. FIG. 9 is a flowchart of a method 900 according to an embodiment. Method 900 includes deploying a marine seismic source including one or more individual source elements configured to generate seismic waves, at 910. Method 900 further includes providing a ghost attenuator for reducing or eliminating ghost signals related to at least one of the individual source elements, at 920. Method 900 also includes activating the one or more individual source elements at 930 and acquiring seismic data by detecting pressure variations as a function of time related to signals generated when the one or more individual source elements have been activated and emerge from a formation under the seafloor, at 940.

The disclosed exemplary embodiments provide methods and devices (ghost attenuators) for mitigating the ghost effect. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine seismic source comprising:
   a float;
   individual source elements attached to the float and configured to generate seismic waves; and
   a ghost attenuator attached to the float, located between the float and the individual source elements, and configured for reducing or eliminating ghost signals related to one of the individual source elements, the ghost attenuator being located between the one of the individual source elements and the water surface,
   wherein the ghost attenuator is configured to dissipate energy of up-going signals and has at least one slanted side to redirect the up-going signals from the one of the individual source elements, and
   wherein the ghost attenuator is located closer to the individual source elements than to the water surface.

2. The marine seismic source of claim 1, wherein the ghost attenuator is another float having positive buoyancy and a signal propagation velocity inside the float is smaller than a signal propagation velocity in water.

3. The marine seismic source of claim 2, wherein the another float has a triangular cross-section in a vertical plane, the triangular cross-section having substantially horizontal side and a vertex opposite to the horizontal side a larger depth than the side.

4. The marine seismic source of claim 3, wherein the ghost attenuator has an outer shell having at least one surface corresponding to a side of the triangle made of rigid plastic.

5. The marine seismic source of claim 3, wherein the ghost attenuator has an outer shell having at least one surface corresponding to a side of the triangle made of a soft plastic.

6. The marine seismic source of claim 3, wherein an attack angle associated with the vertex is 90°.

7. The marine seismic source of claim 1, wherein the ghost attenuator has a shape thinner above the submerged at least one of the individual source elements than laterally relative to a vertical line passing through the submerged at least one of the individual source elements.

8. The marine seismic source of claim 1, wherein the ghost attenuator includes one or more wave guides, each wave guide consisting of a bended tube.

9. The marine seismic source of claim 1, wherein the ghost attenuator includes a substantially horizontal flat plate linked to another element located under the flat plate.

10. The marine seismic source of claim 9, wherein the flat plate and the other element are made of metal, plastic and/or foam, or a multilayer composite of these materials.

11. The marine seismic source of claim 9, wherein the other element is another substantially horizontal flat plate.

12. The marine seismic source of claim 9, wherein the other element is a wedge plate, having a triangular vertical cross-section, with a substantially horizontal lower side.

13. The marine seismic source of claim 9, wherein the plate and the other element are made of different materials.

14. The marine seismic source of claim 9, wherein the plate and the other element are attached to one another via elastic links.

15. A ghost attenuator for reducing or eliminating ghost signals related to an individual source element of a marine seismic source, the ghost attenuator comprising:
   an outer shell made of plastic and filled with a substance having a positive buoyancy, a signal propagation velocity in the substance being smaller than a signal propagation velocity in water, the outer shell having a triangular cross-section in a vertical plane, the triangular cross-section having substantially horizontal upper side,
wherein an attack angle opposite to the upper side is selectable.

16. The ghost attenuator of claim 15, wherein the outer shell has at least one surface corresponding to a side of the triangle made of a rigid plastic.

17. The ghost attenuator of claim 15, wherein the outer shell has at least one surface corresponding to a side of the triangle made of a soft plastic.

18. A method for seismic data acquisition, the method comprising:
deploying a marine seismic source including one or more individual source elements attached to a float, the one or more individual source elements being configured to generate seismic waves;
providing a ghost attenuator between the float and the one or more individual source elements for reducing or eliminating ghost signals related to one of the individual source elements;
activating the one or more individual source elements; and
acquiring seismic data by detecting pressure variations as a function of time related to signals generated when the one or more individual source elements have been activated, the signal penetrating a formation under the seafloor,
wherein the ghost attenuator is configured to dissipate energy of up-going signals and has at least one slanted side to redirect the up-going signals from the one of the individual source elements, and
wherein the ghost attenuator is located closer to the individual source elements than to the water surface.

19. The method of claim 18, wherein the ghost attenuator is another float having positive buoyancy and a signal propagation velocity inside the another float is smaller than a signal propagation velocity in water.

20. The method of claim 18, wherein the ghost attenuator includes a substantially horizontal flat plate linked to another element located under the flat plate.

* * * * *